(12) United States Patent  
Jiang et al.

(10) Patent No.: US 8,341,826 B1
(45) Date of Patent: Jan. 1, 2013

(54) METHOD FOR FABRICATING A MAGNETIC RECORDING TRANSDUCER USING A SPLIT SEED LAYER

(75) Inventors: Hai Jiang, Pleasanton, CA (US); Yunhe Huang, Pleasanton, CA (US); Jinwen Wang, Fremont, CA (US); Yun-Fei Li, Fremont, CA (US); Ying Hong, Morgan Hill, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 262 days.

(21) Appl. No.: 12/758,469

(22) Filed: Apr. 12, 2010

(51) Int. Cl.
G11B 5/127 (2006.01)
H04R 31/00 (2006.01)

(52) U.S. Cl. ............ 29/603.16; 29/603.11; 29/603.12; 29/603.13; 29/603.15; 29/603.18; 216/22; 216/39; 216/41; 216/48; 216/65; 451/5; 451/41; 360/121; 360/122; 360/317

(58) Field of Classification Search ............ 29/603.11, 29/603.13–603.16, 603.18; 216/22, 39, 41, 216/48, 65; 451/5, 41; 360/121, 122, 317
See application file for complete search history.

(56) References Cited

U.S. PATENT DOCUMENTS

| 7,394,621 | B2 | 7/2008 | Li et al. |
| 7,518,824 | B2 * | 4/2009 | Sasaki et al. ............. 360/125.09 |
| 7,554,767 | B1 | 6/2009 | Hu et al. |
| 7,870,660 | B2 * | 1/2011 | Sasaki et al. ............... 29/603.16 |
| 2005/0271904 | A1 * | 12/2005 | Li et al. ....................... 428/842.1 |

FOREIGN PATENT DOCUMENTS

WO    2005109405 A1    11/2005

* cited by examiner

*Primary Examiner* — Paul D Kim (57) ABSTRACT

A method and system for fabricating magnetic transducer are described.
The method and system include providing a main pole having a bottom, a top wider than the bottom, and a top bevel. A nonmagnetic gap covering the main pole is provided. A portion of the nonmagnetic gap resides on the top of the main pole. A first seed layer is provided. At least a portion of the first seed layer covers the portion of the nonmagnetic gap on top of the main pole. A portion of the nonmagnetic gap on the magnetic recording transducer is removed after the first seed layer is provided. A second seed layer is provided after the portion of the nonmagnetic gap is removed. The second seed layer covers at least the portion of the first seed layer. A wrap-around shield layer is provided on the second seed layer.

13 Claims, 7 Drawing Sheets

METHOD FOR FABRICATING A MAGNETIC RECORDING TRANSDUCER USING A SPLIT SEED LAYER

BACKGROUND

Figure 1:
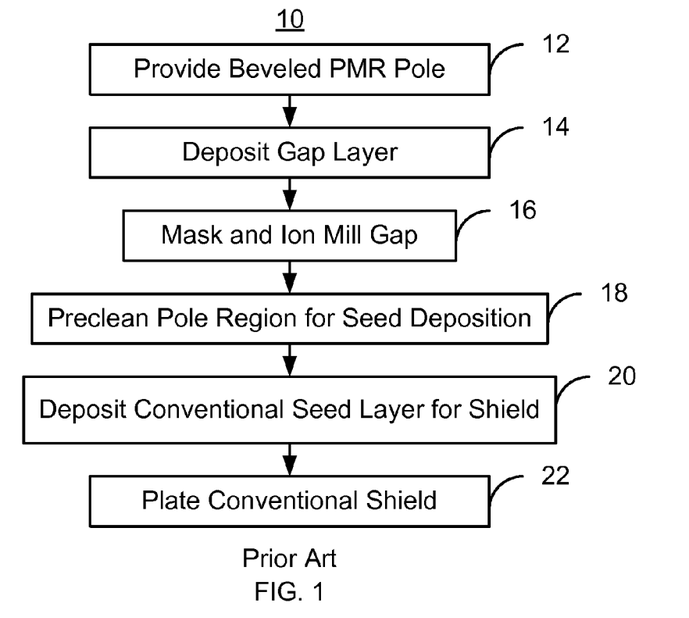
FIG. 1 is a flow chart depicting a conventional method for fabricating a PMR transducer.

FIG. 1 is a flow chart depicting a conventional method 10 for fabricating a conventional perpendicular magnetic recording (PMR) transducer. For simplicity, some steps are omitted. A conventional, beveled PMR pole is provided, via step 12. The conventional pole is magnetic and has a top wider than its bottom. In addition, the conventional pole has a bevel. Thus, the conventional pole is shorter in the region of the air-bearing surface (ABS) location. The ABS location is the location at which the ABS will reside in the completed structure. The conventional pole may include a leading edge bevel, a trailing edge bevel, or both.

A conventional gap layer is deposited, via step 14. The conventional gap layer is nonmagnetic and may be insulating. The conventional gap layer is typically alumina deposited using atomic layer deposition (ALD). As a result, the conventional gap is conformal, covering the top and side of the conventional PMR pole. The conventional PMR head is then masked and a portion of the conventional gap layer milled, via step 16. The milling in step 16 removes a portion of the conventional gap layer from regions of the PMR transducer in which it is not desired. For example, the conventional gap layer is removed from the contacts for the PMR head.

A preclean is then performed, via step 18. The preclean is to prepare the conventional gap layer for deposition of the seed layer and shield. The preclean removes residues of the masking and milling of step 16 as well as a portion of the conventional gap layer. The conventional seed layer for the shield is then deposited, via step 20. For example, CoNiFe or NiFe might be used as the conventional seed layer. The conventional seed layer is a single layer provided in a single deposition in step 20. A wraparound shield may then be plated, via step 22.

Figure 2:
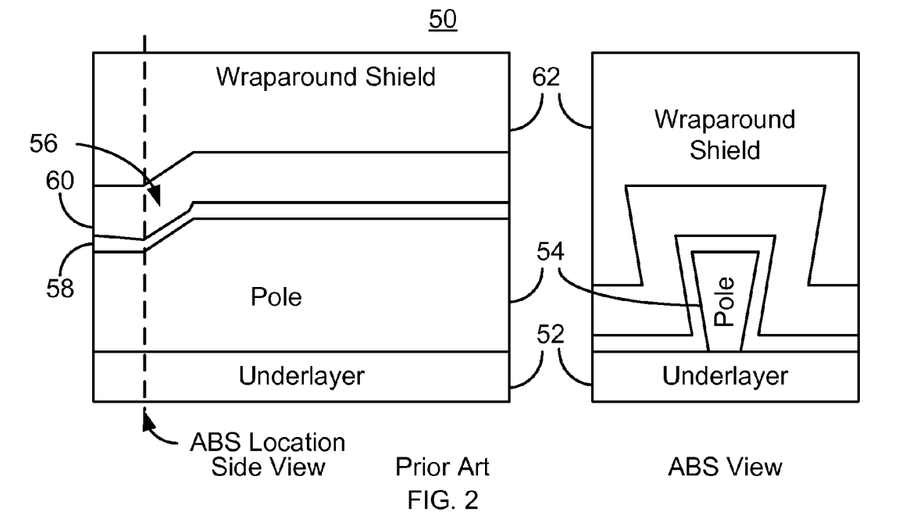
FIG. 2 is a diagram depicting a conventional PMR transducer.

FIG. 2 depicts a portion of a conventional PMR transducer 50 formed using the conventional method 10. The conventional transducer 50 includes an underlayer 52, a conventional pole 54 including trailing bevel 56, a conventional gap 58, a conventional seed layer 60 and a conventional wraparound shield 62. Thus, using the conventional method 10, a pole 54 having a trailing edge bevel 56 and wraparound shield 62 may be formed.

Although the conventional method 10 may provide the conventional PMR transducer 50, there may be drawbacks. In particular, the preclean performed in step 18 may cause variations in the thickness of the conventional gap layer 58. The sloped portion of the conventional gap layer 58 on the sloped surface of the bevel 56 may etch at a different rate than the portion of the gap layer on the flat portions of the pole. As a result, there may be variations in the thickness of the conventional gap layer 58, particularly at or near the ABS location. For example, the conventional gap layer may be desired to be twenty-six nanometers thick. However, because of the uneven etching, the thickness of the conventional gap layer 58 may range from twenty-two through twenty-six nanometers. Such large variations result in variations in the profile of the magnetic field, which are quite undesirable. Accordingly, what is needed is an improved method for fabricating a PMR transducer.

SUMMARY

A method and system for fabricating magnetic transducer are described. The method and system include providing a main pole having a bottom, a top wider than the bottom, and a top bevel. A nonmagnetic gap covering the main pole is provided. A portion of the nonmagnetic gap resides on the top of the main pole. A first seed layer is provided. At least a portion of the first seed layer covers the portion of the nonmagnetic gap on top of the main pole. A portion of the nonmagnetic gap on the magnetic recording transducer is removed after the first seed layer is provided. A second seed layer is provided after the portion of the nonmagnetic gap is removed. The second seed layer covers at least the portion of the first seed layer. A wrap-around shield layer is provided on the second seed layer

DETAILED DESCRIPTION OF THE PREFERRED EMBODIMENTS

Figure 3:
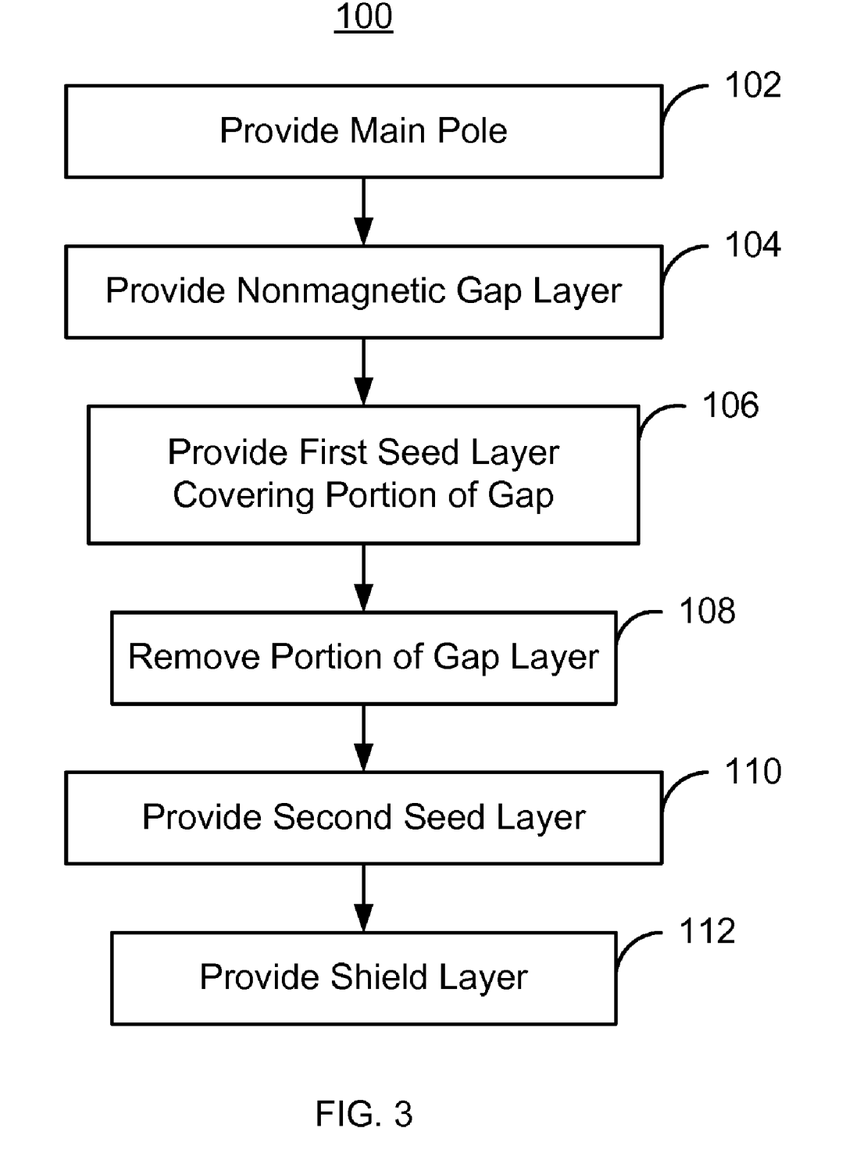
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple structure and/or multiple transducers at substantially the same time. The method 100 and system are also described in the context of particular layers. However, in some embodiments, such layers may include multiple sublayers. In one embodiment, the method 100 commences after formation of the underlayer(s) on which the PMR pole is to reside.

A main pole having a bottom is provided, via step 102. The main pole may be a PMR pole. Thus, the top of the main pole may be wider than the bottom. In addition, a top, or trailing edge, bevel is also provided in step 102. Step 102 may be performed by depositing a layer, providing a trench having the desired profile in the layer, depositing the material(s) for the pole in the trench, and removing a portion layer surrounding the pole. Alternatively, the magnetic and other material(s) for the pole may be deposited and a portion of the material(s) removed to form the pole.

A nonmagnetic gap covering the main pole is provided, via step 104. A portion of the nonmagnetic gap resides on the top of the main pole. In some embodiments, step 104 includes depositing a nonmagnetic layer, such as alumina, using ALD.

Because ALD is used, the nonmagnetic gap may be conformally deposited. Thus, the top and sides of the main pole are covered by the nonmagnetic gap. Further, the nonmagnetic gap may follow the profile of the main pole. However, in other embodiments, other deposition mechanisms, including nonconformal deposition, may be used. In addition, the nonmagnetic gap may cover other structures in the transducer.

A first seed layer is provided on the gap layer, for example by sputtering, via step 106. At least a portion of the first seed layer covers the portion of the nonmagnetic gap that resides on top of the main pole. The first seed layer may include materials such as CoNiFe or NiFe. In other embodiments, other materials may be used. In some embodiments, therefore the first seed layer has a thickness of at least five nanometers. In some embodiments the first seed layer is not more than twenty nanometers thick. In other embodiments, the first seed layer is at least ten nanometers and not more than fifteen nanometers in thickness. Step 106 may include performing a minimal pre-sputter clean prior to deposition of the first seed layer. For example, in some embodiment, the preclean of the nonmagnetic gap removes not more than ten Angstroms of the portion of the nonmagnetic gap on the top of the main pole.

A portion of the nonmagnetic gap on the magnetic recording transducer is removed after the first seed layer is provided, via step 108. Through step 108, the part of the nonmagnetic gap layer on structures such as the contacts for the PMR transducer are removed. Step 108 may thus include providing a mask on the magnetic recording transducer. The mask exposes the sites on which the nonmagnetic gap is to be removed. The magnetic recording transducer is then ion milled to remove the nonmagnetic gap on the desired sites. The mask is then removed. Consequently, contact may be made to the PMR transducer.

A second seed layer is provided after the portion of the nonmagnetic gap is removed, via step 110. The second seed layer covers at least the portion of the first seed layer on the main pole. The second seed layer may include materials such as CoNiFe or NiFe. Thus, the first and second seed layers may be magnetic. In other embodiments, other materials may be used. In some embodiments, the first seed layer and the second seed layer may include the same material(s). In other embodiments, the first and second seed layers may include different materials. Step 110 may include performing a preclean prior to deposition of the second seed layer. The preclean may be used to remove any oxide formed on the first seed layer during removal of the gap layer in step 108. The first seed layer provided in step 106 is sufficiently thick that the first seed layer remains a continuous layer after the preclean for deposition of the second seed layer is completed. The total thickness of the first and second seed layers deposited does not exceed one hundred nanometers. In some embodiments, the second seed layer is at least thirty five and not more than one hundred nanometers thick. In other embodiments, the first and second seed layers are not more than fifty nanometers thick.

A wrap-around shield layer is provided on the second seed layer, via step 112. Step 112 may include plating or otherwise depositing a magnetic material such as NiFe on the seed layer.

Figure 4:
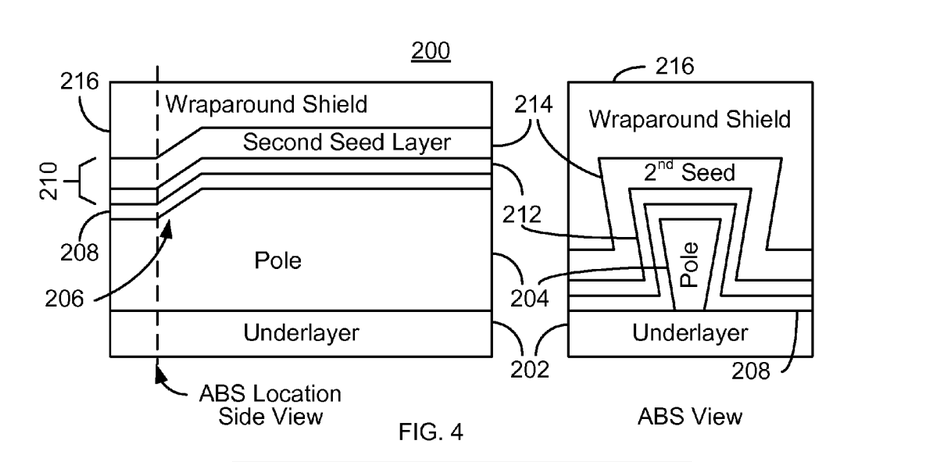
FIG. 4 is a diagram depicting an exemplary embodiment of a PMR transducer.
Figure 5:
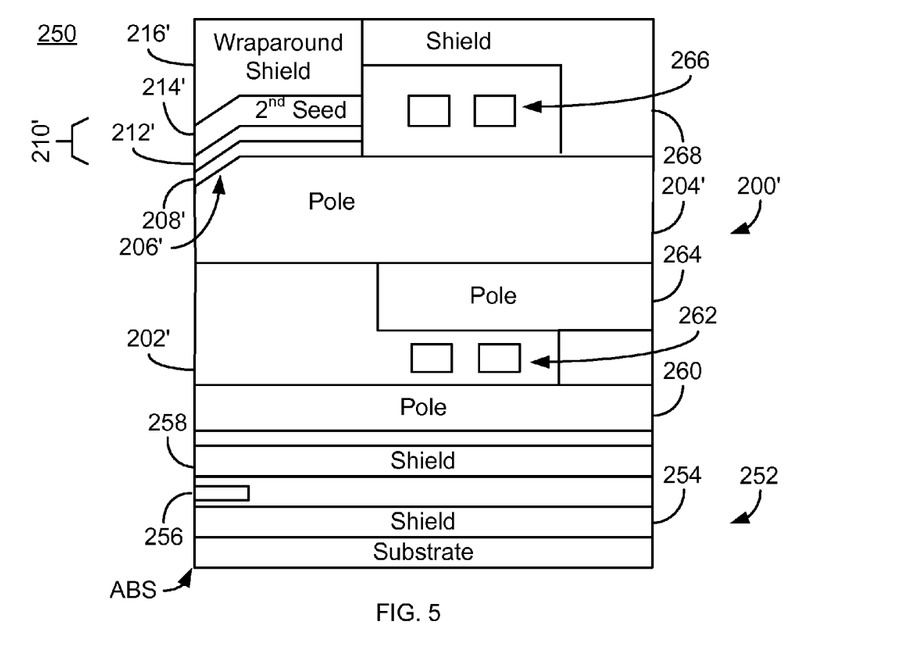
FIG. 5 is a diagram depicting an exemplary embodiment of a PMR head incorporating the PMR transducer.

FIG. 4 is a diagram depicting an exemplary embodiment of a portion of a PMR transducer 200 that may be formed using the method 100. FIG. 5 depicts a head 250 incorporating the transducer 200'. For clarity, FIGS. 4-5 are not to scale. FIG. 4 depicts side and ABS views of the transducer 200, while FIG. 5 depicts a side view only of the head 250. The head 250 shown includes a read transducer 252 and the PMR transducer 200'. However, in another embodiment, the transducer 200/200' may be used in a head including only one or more write transducers 200/200'. The read transducer 252 includes shields 254 and 258 as well as sensor 256. The PMR transducer 200' shown in FIG. 5 includes poles 260 and 264, shield 268, and coils 262 and 266 in addition to the portion of the PMR transducer 200 that is also shown in FIG. 4. The PMR transducer 200/200' includes underlayer 202', a main pole 204/204' having a trailing edge bevel 206/206', gap 208/208', seed layer 210/210' that includes a first seed layer 212/212' and a second seed layer 214/214', and trailing shield 220/220'. Other and/or different components may be fabricated in other embodiments. Although not shown, the pole 204/204' might also include a bottom, or leading edge bevel. However, in some embodiments, the leading edge bevel may be omitted. Also shown is the ABS location in FIG. 4 and the ABS in FIG. 5. For example, in some embodiments, the transducer 200 is lapped to expose the surface of the transducer 200 at the ABS location.

Using the method 100, the wraparound shield 216/216' may be provided in the PMR transducer 200/200'. More specifically, the seed layers 212/212' and 214/214' may be used to provide the wraparound shield 216/216 such that the thickness of the gap 208/208' is better controlled. The first seed layer 212/212' is provided on the portion of the gap 208/208' that is on the pole 204/204'. Consequently, the gap 208/208' may be protected during the removal of the gap 208/208' from portions of the transducer 200/200', such as the contacts (not shown). As a result, the thickness of the gap 208/208' may be better controlled. In some embodiments, the final thickness of the gap 208/208' is substantially the same as the thickness of the gap 208/208' as deposited. For example, in some embodiments, the thickness of the gap may be controlled to within one nanometer of the desired thickness. As a result, the profile of the magnetic field from the pole 204/204' may be better controlled. Consequently, performance of the PMR transducer 200/200' and head 250 may be improved.

Figure 6:
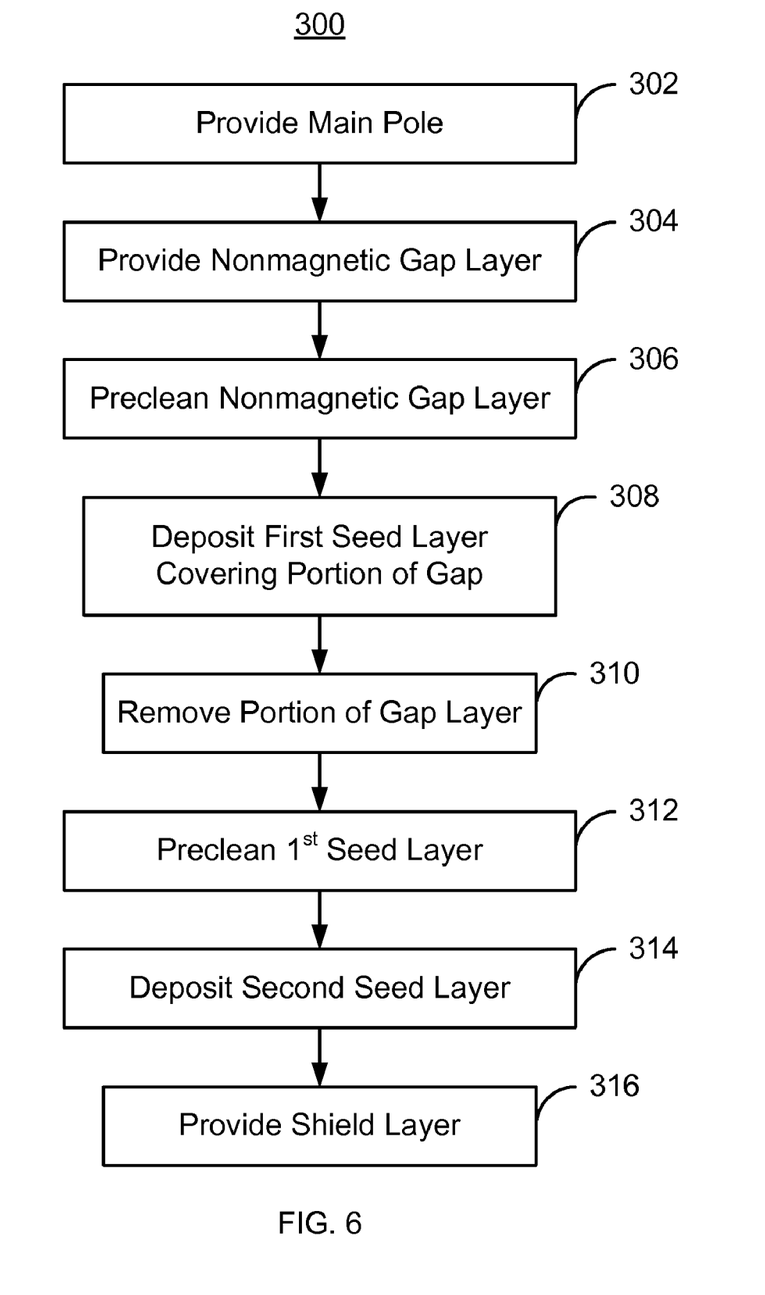
FIG. 6 is a flow chart depicting another exemplary embodiment of a method for fabricating a PMR transducer.

FIG. 6 is a flow chart depicting another exemplary embodiment of a method 300 for fabricating a PMR transducer. For simplicity, some steps may be omitted. FIGS. 7-11 are diagrams depicting side and ABS views of an exemplary embodiment of a portion of a PMR transducer during 400 fabrication. For clarity, FIGS. 7-11 are not to scale. Further, although FIGS. 7-11 depict the ABS location at a particular point in the pole, other embodiments may have other locations for the ABS. Referring to FIGS. 6-11, the method 300 is described in the context of the PMR transducer 400. However, the method 300 may be used to form another device (not shown). The PMR transducer 400 being fabricated may be part of a merged head that also includes a read head (not shown in FIGS. 7-11) and resides on a slider (not shown) in a disk drive. The method 300 also may commence after formation of other portions of the PMR transducer 400. The method 300 is also described in the context of providing a single PMR transducer 400. However, the method 300 may be used to fabricate multiple transducers at substantially the same time. The method 300 and device 400 are also described in the context of particular layers. However, in some embodiments, such layers may include multiple sublayers.

Figure 7:
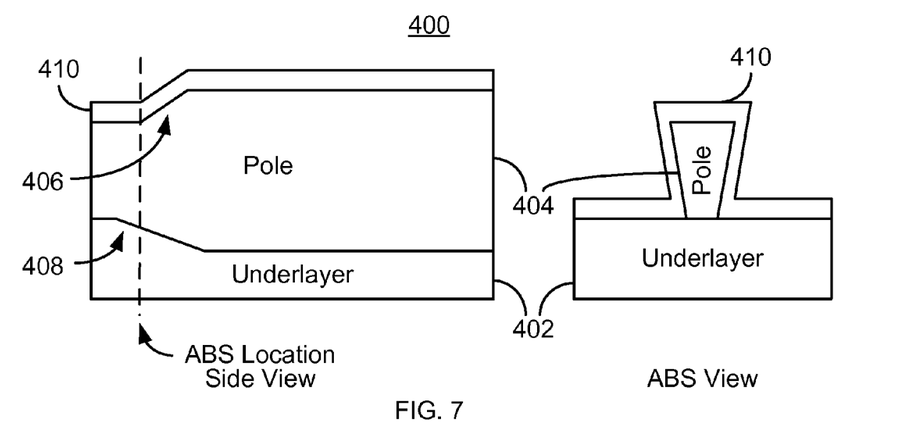
FIGS. 7-11 are diagrams depicting an exemplary embodiment of a PMR transducer during fabrication.

A main pole having a bottom is provided, via step 302. Step 302 is analogous to step 102 of the method 100. The main pole may be a PMR pole. Thus, the top of the main pole may be wider than the bottom. In addition, a top, or trailing edge, bevel is also provided in step 302. Step 302 may be performed by depositing a layer, providing a trench having the desired profile in the layer, depositing the material(s) for the pole in the trench, and remove the portion of the layer adjacent to the pole. Alternatively, the magnetic and other material(s) for the pole may be deposited and a portion of the material(s) removed to form the pole. In some embodiments, A nonmagnetic gap covering the main pole is provided, via step 304. Step 304 is analogous to step 104 of the method 100. A portion of the nonmagnetic gap resides on the top of the main pole. Step 104 may include depositing a nonmagnetic layer, such as alumina, using ALD. Because ALD is used, the nonmagnetic gap may be conformally deposited. Thus, the top and sides of the main pole are covered by the nonmagnetic gap. Further, the nonmagnetic gap may follow the profile of the main pole. However, in other embodiments, other deposition mechanisms, including nonconformal deposition, may be used. In such a case, the wraparound shield provided, as well as seed layers used, may not be conformal. Further, other material(s), such as conductors, might also be used for the gap in other embodiments. FIG. 7 depicts the PMR transducer 400 after step 304 is completed. Thus, an underlayer 402, pole 406, and gap 410 are shown. The pole 402 is magnetic and includes leading edge bevel 408 and trailing edge bevel 406. Although both leading edge bevel 408 and trailing edge bevel 406 are shown, in another embodiment one or more of the bevels 406 and 408 may be omitted. The gap layer 410 is nonmagnetic and may be alumina. In the embodiment shown, the gap 410 may be deposited at a thickness slightly larger than the desired final thickness. However, in other embodiments, the gap layer 410 has the desired final thickness as-deposited.

The nonmagnetic gap 410 is precleaned, or etched, via step 306. The precleaning in step 306 is very light. Thus, not more than ten Angstroms of the portion of the nonmagnetic gap 410 on the top of the main pole 406 is removed. In some embodiments, less than ten Angstroms of the gap 410 may be used. For example, in some embodiments one Angstrom or less of the gap 410 may be removed. Thus, the change in the gap 410 thickness might be negligible.

Figure 8:
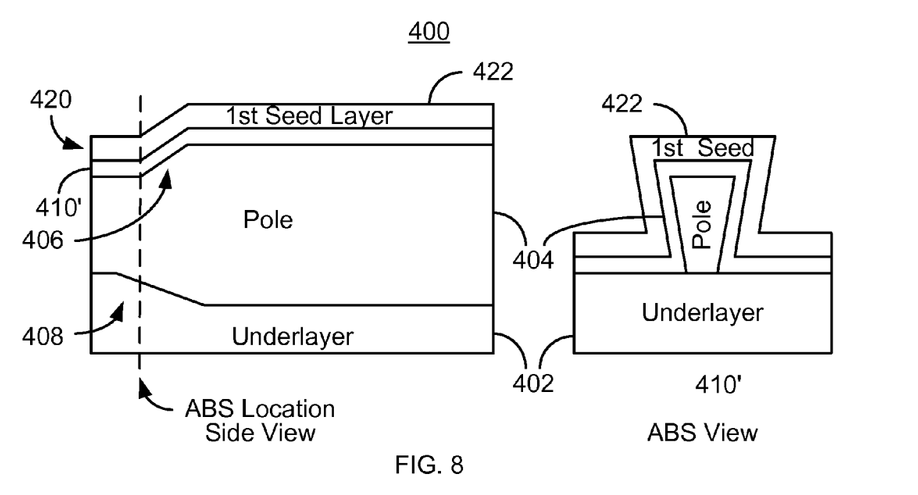

A first seed layer is deposited, via step 308. At least a portion of the first seed layer covers the portion of the nonmagnetic gap 410 on top of the main pole 404. Step 308 may include sputtering or otherwise depositing the first seed layer. The first seed layer may include materials such as CoNiFe or NiFe. In other embodiments, other materials may be used. In some embodiments, the first seed layer has a thickness of at least five nanometers and not more than twenty nanometers thick. In some such embodiments, the first seed layer is at least ten nanometers and not more than fifteen nanometers in thickness. FIG. 8 depicts the PMR transducer 400 after step 308 is performed. Thus, the first seed layer 422 has been deposited. The first seed layer 422 is a sublayer of the seed layer 420. Further, the gap 410' has been etched during the preclean. Consequently, in the embodiment shown, the gap 410' is very slightly thinner than the gap 410 depicted in FIG. 7.

Figure 9:
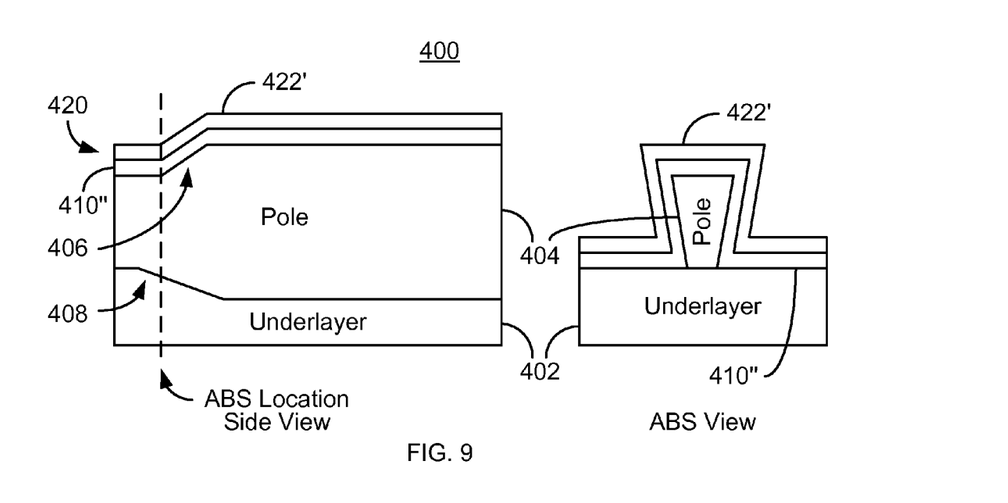

A portion of the nonmagnetic gap 410' on the magnetic recording transducer is removed after the first seed layer is provided, via step 310. Through step 310, the part of the nonmagnetic gap layer 410' on sites, such as the contacts for the PMR transducer, is removed. Step 310 includes providing on the magnetic recording transducer 400 a mask that exposes the sites on which the nonmagnetic gap 410' is to be removed. The magnetic recording transducer 400 is then ion milled to remove the nonmagnetic gap 410' on the desired sites and the mask removed. FIG. 9 depicts the PMR transducer 400 after step 310 is preformed. Although the first seed layer 422' has protected the portion of the gap layer 410" on the pole 404, a thin oxide layer (not separately shown) may be formed on the surface of the first seed layer 422'. Portions of the gap layer 410" (not shown) have been removed from the desired sites.

The magnetic recording transducer 400 undergoes a precleaning, via step 312. More specifically, the first seed layer 422' is precleaned, removing oxide and/or other artifacts of the removal of part of the gap layer 410" in step 310. The thickness of the first seed layer 422' is sufficiently large that the first seed layer 422' remains a continuous layer after precleaning the magnetic recording transducer 400 in step 312 is completed.

Figure 10:
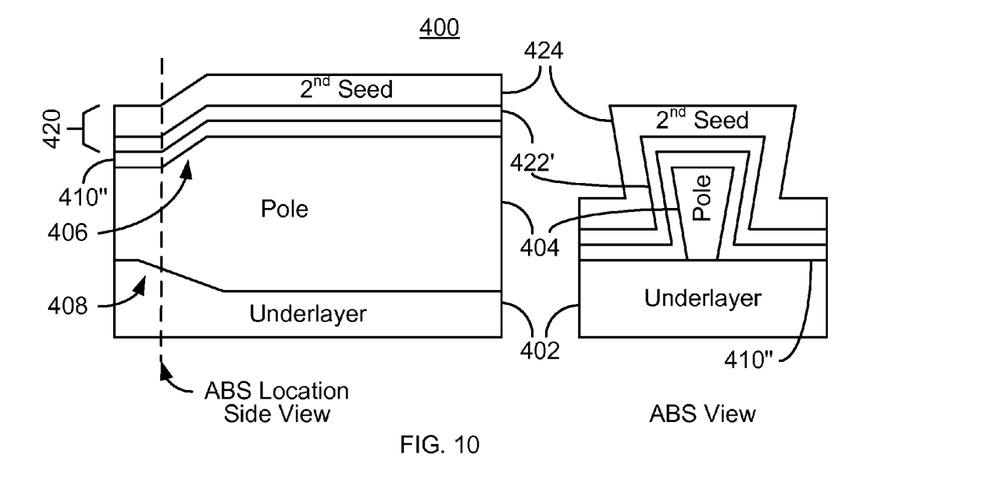

A second seed layer is deposited after the first seed layer 422' is precleaned, via step 314. The second seed layer covers at least the portion of the first seed layer 422' on the main pole. Step 314 may include sputtering or otherwise depositing the second seed layer. FIG. 10 depicts the transducer 400 after step 314 is performed. Consequently, the second seed layer 424 has been deposited. Consequently, the seed layer 420 may be considered to include the first seed layer 422' and the second seed layer 424. The first and second seed layers 422' and 424 may include the same or different materials. However, even if composed of the same materials, the first seed layer 422' is deposited in a separate step from the second seed layer 424. More specifically, the first seed layer 422' is deposited before the gap layer removal in step 310, while the second seed layer 424 is deposited after the gap layer removal in step 310. The second seed layer 424 may include materials such as CoNiFe or NiFe. Thus, the first seed layer 422' and the second seed layer 424 may be magnetic. In other embodiments, other materials may be used. In some embodiments, the total thickness of the seed layer 420 (i.e. the first seed layer 422' and second seed layer 424 combined) does not exceed one hundred nanometers. In some embodiments, the second seed layer 424 is at least thirty-five nanometers and not more than one hundred nanometers thick. In other embodiments, the total thickness of the seed layer 420 is not more than fifty nanometers.

Figure 11:
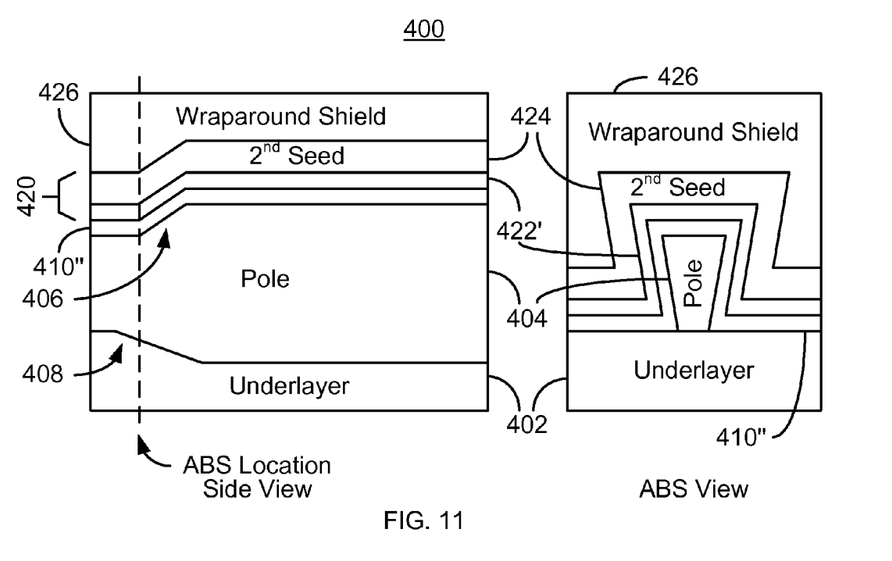

A wrap-around shield layer is provided on the second seed layer, via step 316. Step 316 may include plating or otherwise depositing a magnetic material, such as NiFe, on the seed layer. FIG. 11 depicts the transducer 400 after step 316 is preformed. Thus, a wraparound shield 426 has been provided. In the embodiment shown, the wraparound shield 426 is conformal to the pole 404. However, in other embodiments, the wraparound shield 426 may not be conformal. Thus, the inner surface of the wraparound shield 426 need follow the profile of the pole 404.

Using the method 100, the PMR transducer 400 is provided. Because seed layer 422' and 424 are used, the thickness of the gap 410" may be better controlled. The gap 410' may be protected during the removal of portions of the gap 410' from sites in the transducer 400, such as the contacts (not shown). As a result, the thickness of the gap 410' may be better controlled. For example, in some embodiments, the thickness of the gap 410' may be controlled to within one nanometer of the desired thickness. In other embodiments, the thickness of the gap 410' might be controlled to within less than one nanometer. Consequently, performance of the PMR transducer 400 may be improved.

We claim:

1. A method for fabricating a magnetic recording transducer comprising:

providing a main pole having a bottom, a top wider than the bottom, and a top bevel;

providing a nonmagnetic gap covering the main pole, a portion of the nonmagnetic gap residing on the top of the main pole;

providing a first seed layer, at least a portion of the first seed layer covering the portion of the nonmagnetic gap on top of the main pole;

removing an additional portion of the nonmagnetic gap not residing on the main pole after the first seed layer is provided;
providing a second seed layer after the portion of the nonmagnetic gap is removed, the second seed layer covering at least the portion of the first seed layer; and
providing a wrap-around shield layer on the second seed layer.

2. The method of claim 1 wherein the step of providing the first seed layer further includes:
precleaning the nonmagnetic gap, the precleaning removing not more than ten Angstroms of the portion of the nonmagnetic gap on the top of the main pole; and
depositing the first seed layer.

3. The method of claim 1 wherein the step of providing the second seed layer further includes:
precleaning the first seed layer, the first seed layer being sufficiently thick that the first seed layer remains a continuous layer after the step of precleaning is completed; and
depositing the second seed layer.

4. The method of claim 1 wherein a total thickness of the first seed layer plus the second seed layer does not exceed one hundred nanometers.

5. The method of claim 1 wherein the first seed layer is at least five nanometers thick.

6. The method of claim 5 wherein the first seed layer is not more than twenty nanometers thick.

7. The method of claim 6 wherein the second seed layer is at least thirty-five and not more than one hundred nanometers thick.

8. The method of claim 1 wherein the magnetic recording transducer further includes a plurality of electrical contacts distal from the main pole and wherein the step of removing the additional portion of the nonmagnetic gap further includes:
providing a mask on the first seed layer, the mask exposing the plurality of electrical contacts and a portion of the main pole;
ion milling the nonmagnetic gap layer after the mask is provided; and
removing the mask.

9. The method of claim 1 wherein the first seed layer includes a first material and the second seed layer includes a second material different from the first material.

10. The method of claim 1 wherein the first seed layer includes a material and the second seed layer includes the material.

11. The method of claim 1 wherein at least one of the first seed layer and the second seed layer includes CoNiFe.

12. The method of claim 1 wherein at least one of the first seed layer and the second seed layer includes NiFe.

13. A method for fabricating a magnetic recording transducer comprising:
providing a main pole having a bottom, a top wider than the bottom, and a top bevel;
providing a nonmagnetic gap covering the main pole, a portion of the nonmagnetic gap residing on the top of the main pole;
precleaning the nonmagnetic gap, the precleaning removing not more than ten Angstroms of the portion of the nonmagnetic gap on the top of the main pole;
depositing a first seed layer, at least a portion of the first seed layer covering the portion of the nonmagnetic gap on top of the main pole, the first seed layer having a first thickness of at least five and not more than twenty nanometers thick;
removing an additional portion of the nonmagnetic gap not residing on the main pole after the first seed layer is provided;
precleaning the first seed layer, the first thickness of the first seed layer being sufficiently large that the first seed layer remains a continuous layer after the step of precleaning the first seed layer is completed; and
depositing the second seed layer after the portion of the nonmagnetic gap is removed and after the step of precleaning the first seed layer, the second seed layer covering at least the portion of the first seed layer and having a second thickness, the first thickness plus the second thickness being not more than one hundred nanometers; and
providing a wrap-around shield layer on the second seed layer.

* * * * *